United States Patent [19]
Lee

[11] 3,991,863
[45] Nov. 16, 1976

[54] METERING SHOCK ABSORBER WITH MANUAL ADJUSTMENT

[75] Inventor: Patrick P. Lee, Tonawanda, N.Y.

[73] Assignee: Integrated Dynamics Incorporated, Buffalo, N.Y.

[22] Filed: Jan. 3, 1975

[21] Appl. No.: 538,399

Related U.S. Application Data

[63] Continuation of Ser. No. 372,837, June 22, 1973, abandoned.

[52] U.S. Cl. .............................. 188/289; 188/299; 188/315; 188/318; 267/8 A; 267/64 B
[51] Int. Cl.² ............................................. F16F 9/48
[58] Field of Search ........... 188/285, 289, 299, 313, 188/314, 315, 318; 267/64 R, 64 B, 8 A; 213/43, 223

[56] References Cited
UNITED STATES PATENTS

| | | | |
|---|---|---|---|
| 1,085,070 | 1/1914 | Voight | 267/8 A |
| 2,243,782 | 5/1941 | Thornhill | 267/64 R |
| 2,994,442 | 8/1961 | Frederick | 267/64 R |
| 3,070,363 | 12/1962 | Ellis | 267/8 A |
| 3,451,510 | 6/1969 | Hartwig | 188/314 |
| 3,525,449 | 8/1970 | Zanow | 188/289 |
| 3,679,069 | 7/1972 | Shaver et al. | 188/315 |
| 3,731,770 | 5/1973 | Bindon | 188/318 |

FOREIGN PATENTS OR APPLICATIONS

| | | | |
|---|---|---|---|
| 912,163 | 5/1954 | Germany | 188/314 |
| 581,704 | 12/1924 | France | 267/64 R |
| 511,188 | 1/1955 | Italy | 267/64 R |
| 817,229 | 7/1959 | United Kingdom | 188/289 |

*Primary Examiner*—Trygve M. Blix
*Assistant Examiner*—Edward R. Kazenske
*Attorney, Agent, or Firm*—Christel & Bean

[57] ABSTRACT

A shock absorber having a piston movable against a head of fluid under externally applied loads transmitted through a hollow piston rod. The piston has a valve surrounding a hollow metering pin defining a primary orifice and an auxiliary orifice, adjustable in size, is formed in the housing for augmenting the primary orifice area. The hollow metering pin provides a passage establishing communication between the auxiliary orifice and an accumulating reservoir located within the hollow piston rod. A fluid circulating system is provided for returning displaced fluid and for dissipating the heat generated in such fluid.

15 Claims, 9 Drawing Figures

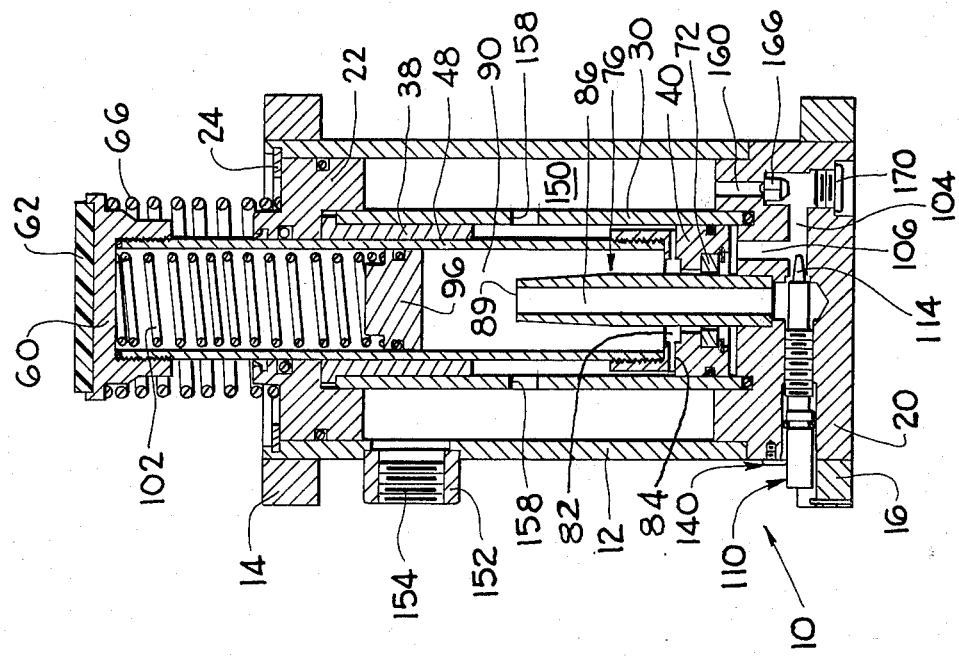

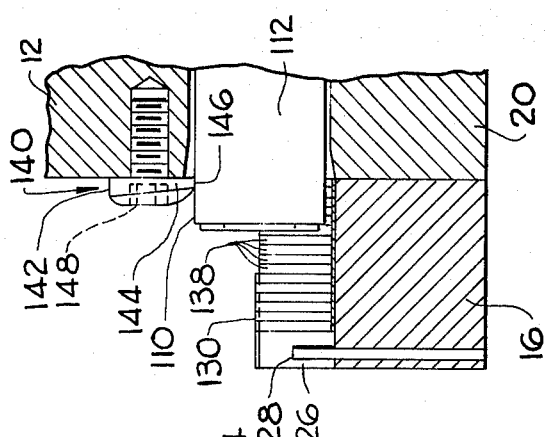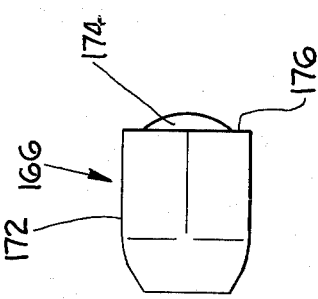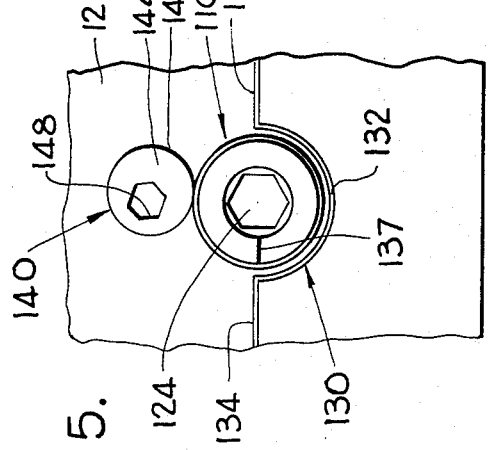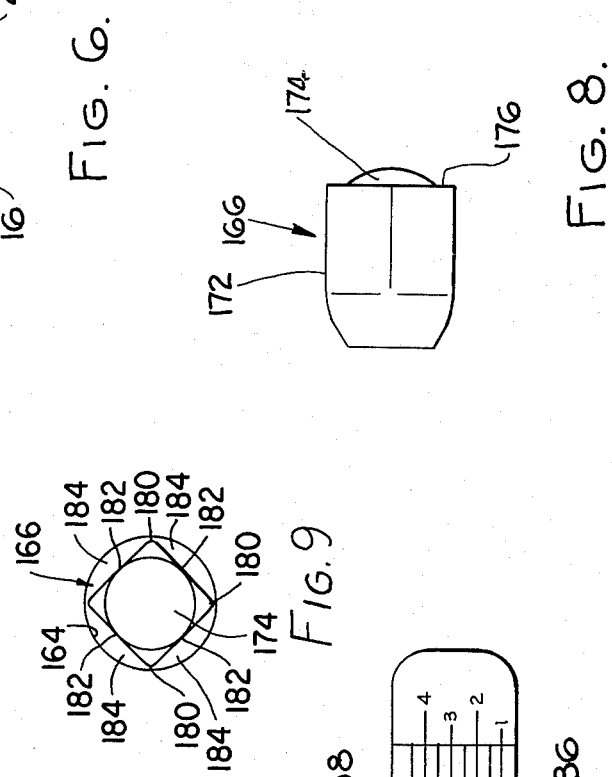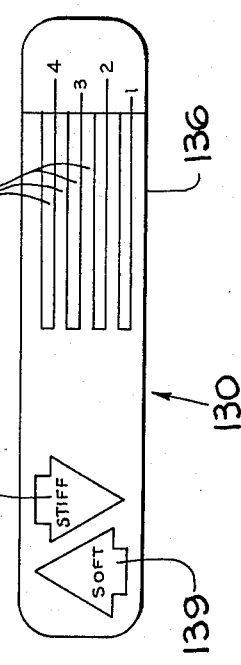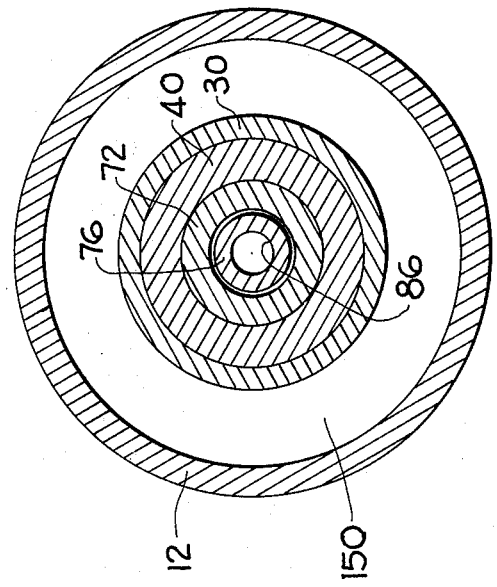

METERING SHOCK ABSORBER WITH MANUAL ADJUSTMENT

This is a continuation of application Ser. No. 372,837, filed June 22, 1973, now abandoned.

BACKGROUND OF THE INVENTION

This invention reltes to shock absorbers and, more particularly, to hydraulic shock absorbers having novel fluid flow circulating and metering means.

Generally, hydraulic shock absorbers provide a restricted orifice for the passage of hydraulic fluid therein from one side of a piston to the other side thereof to retard or dampen the movement of the piston and thereby the relative movement of the parts to which the opposite ends of the shock absorber are attached. Heat is generated in the hydraulic fluid as a result of the consequent pressure drop and increased velocity of the fluid flowing through the restricted orifice from the high pressure side of the piston to the low pressure side thereof. This heat generation is intensified under rapid and repeated cycling of the piston and can pose problems including premature failure of the sealing rings and/or other components of the shock absorber, requiring frequent repair or replacement.

Also, it is sometimes desirable to increase or decrease the rate of fluid flow from one side of the shock absorber piston to the other side thereof for the purpose of adjusting the rate of deceleration of the load applied. To do this with conventional shock absorbers requires access into the internal structure thereof for adjusting or replacing the orifice structure. Not only is this time consuming and expensive, but also exposes the internal structure to contamination, as by particulates and other foreign matter.

SUMMARY OF THE INVENTION

Accordingly, an object of the present invention is to provide an improved shock absorber having a novel fluid circulating system for dissipating heat generated in the hydraulic fluid therein.

Another object of this invention is to provide the foregoing shock absorber with an auxiliary fluid flow metering arrangement.

Still another object of the present invention is to provide the foregoing auxiliary fluid flow metering arrangement with a sensitive adjusting means for varying the flow of fluid therethrough.

It is a further object of this invention to provide a novel shock absorber, which is simple and strong in construction, rugged and durable in use, relatively low in cost, and which has a relatively long useful life under rapid and repeated cyclic conditions.

The foregoing and other objects, advantages and characterizing features of the present invention will become clearly apparent from the ensuing detailed description of an illustrative embodiment thereof, taken together with the accompanying drawings wherein like reference characters denote like parts throughout the various views.

BRIEF DESCRIPTION OF THE DRAWINGS

FIGS. 2 and 3 are views similar to FIG. 1, on a reduced scale, showing successive positions of the piston and illustrating the relative positions of the movable parts of the shock absorber;

FIG. 4 is a cross sectional view, taken about on line 4—4 of FIG. 1;

FIG. 5 is a fragmentary, side elevational view, on an enlarged scale, showing the heads of the adjustment screw and locking screw associated with the shock absorber of FIG. 1;

FIG. 6 is a fragmentary longitudinal sectional view, on an enlarged scale, illustrating the screws of FIG. 5;

FIG. 7 is a top plan view of a label provided with a scale, used in conjunction with this invention;

FIG. 8 is a side elevational view of a check valve associated with the present invention; and FIG. 9 is a top plan view of the check valve of FIG. 8, showing the valve positioned in a bore formed in the shock absorber of this invention.

DETAILED DESCRIPTION OF AN ILLUSTRATIVE EMBODIMENT

Figure 1:
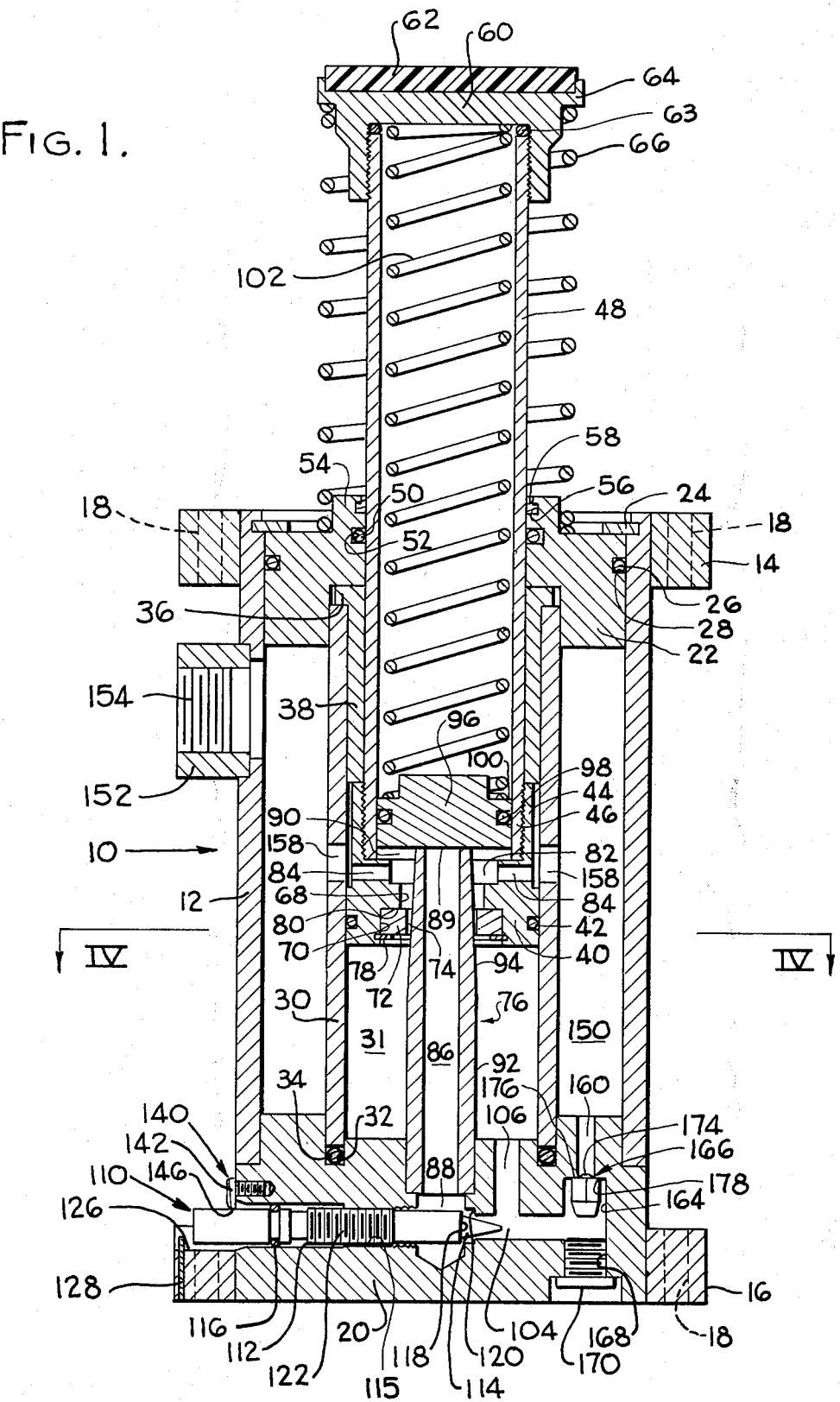
FIG. 1 is a longitudinal sectional view taken centrally through one form of a shock absorber of the present invention.

Referring now to the illustrative embodiment depicted in the accompanying drawings, there is shown in FIG. 1 a shock absorber, generally designated 10, constructed in accordance with this invention, comprising an outer housing or cylindrical shell 12 having laterally projecting flanges 14 and 16 rigidly secured adjacent the opposite ends of shell 12. Flanges 14 and 16 are provided with openings 18 for receiving suitable bolts or other fasteners (not shown) for mounting the shock absorber on desired apparatus. Housing 12 is closed at its lower end by an end plate 20 welded or otherwise fixedly secured thereto and is closed at its other or upper end by a removable end plate 22 suitably retained within housing 12 by a split retainer ring 24 snap fitted into an annular groove formed in the inner wall of housing 12. An O-ring seal 26 is disposed in a peripheral groove 28 formed in end plate 22 to provide a fluid tight seal between the latter and housing 12.

The terms upper, lower, top, bottom and the like, as used herein, are referenced to FIG. 1 for convenience of description and are not used in a limiting sense, it being understood that shock absorber 10 can be oriented in a horizontal direction, or any other direction in use, as desired.

An inner tube or hollow cylinder 30 defining a chamber 31 is mounted within housing 12 in concentric relation thereto with the inner or lower end of cylinder 30 being slip fitted into an annular groove 32 formed in the face of end plate 20. An O-ring seal 34 is compressed between the lower annular edge of cylinder 30 and groove 32 to prevent fluid leakage therebetween. The upper end of cylinder 30 abuts against a flange 36 of a sleeve bearing 38, the flange 36 abutting against the face of end plate 22. This arrangement fixes cylinder 30 and end plate 22 axially in place within housing 12.

Shock absorber 10 includes a piston 40 mounted within cylinder chamber 31 for reciprocating movement relative thereto. A suitable seal 42 is disposed in a peripheral groove formed in piston 40 for providing pressure sealing between the latter and the interior wall of cylinder 30. Piston 40 is provided with a recessed end portion 44 having a threaded connection with the externally threaded end portion 46 of a hollow piston rod 48 extending axially through sleeve 38 and outwardly through end plate 22. A sealing ring 50 is captively retained in an inner annular groove 52 formed in end plate 22 for providing a fluid tight seal between piston rod 48 and end plate 22. A central boss-like projection 54 is formed integral with the outer face of end plate 22 and is provided with an inner annular groove 56 for receiving a suitable annular rod wiper 58, preferably formed of a resiliently yieldable material such as urethane for example, to scrape and wipe the outer surface of piston rod 48 clean.

The outer or upper end of piston rod 48 is provided with a cap 60 threadably secured thereto and carrying a bumper 62 on its outer face for receiving impact loads applied to shock absorber 10. However, bumper 62 can be deleted, if desired. An O-ring seal 63 is compressed between the outer end of piston rod 48 and cap 60 to prevent fluid leakage therebetween. Bumper 62 preferably is formed of a resiliency yieldable material, such as urethane for example, and covers substantially the entire facial area of cap 60. Cap 60 has a flange 64 against which one end of a heavy duty, repositioning coil spring 66 abuts, the other end of coil spring 66 abutting against the outer face of end plate 22. Coil spring 66 is disposed about the exposed portion of piston rod 48 for biasing the same into its outer or extended position.

Piston 40 is provided with a primary orifice structure including an axial bore 68 having an enlarged diameter bore portion or recess 70 for receiving a floating valve 72. Valve 72 is provided with a central opening 74 for receiving a hollow metering pin 76 therethrough and defining therewith a primary orifice for the flow of fluid from one side of piston 40 to the other side thereof upon downward movement of the latter. Valve 72 is captively retained within recess 70 for limited free axial movement between a retaining ring 78 and an abutment shoulder 80 defined between bore 68 and recess 70. There also is slight clearance between the outer peripheral surface of valve 72 and the annular wall surface of recess 70 permitting some lateral play therebetween. This floating feature of valve 72 is important in rendering it self-centering relative to metering pin 76 upon relative axial movement therebetween so as to insure concentricity of valve 72 relative to metering pin 76 and preclude binding therebetween as a result of out-of-round tolerences formed in these components during fabrication. The opposite end of piston 40 also is provided with an enlarged diameter bore portion or central cavity 82 communicating with the interior of cylinder 30 on one side of piston 40 by means of a plurality of radial passages 84. While preferably four such passages 84 are provided in piston 40, it should be understood that more or less than four passages can be formed in piston 40, if desired.

Orifice metering pin 76 is mounted at its inner or lower end in end plate 20 and has an axial bore 86 extending therethrough communicating at one end thereof with an axial cavity 88 formed in end plate 20 and having an outlet 89 at its other end communicating with a chamber or accumulating reservoir 90 defined by the inner wall surface of hollow piston rod 48 and located on the upper side of piston 40. Metering pin 76 has a major portion 92 of a constant outside diameter and a minor tapered portion 94 of a gradually decreasing outside diameter in the upward direction to define with opening 74 of valve 72 and gradually changing orifice area upon axial movement of valve member 72 relative to metering pin 76. As piston 40 moves downwardly, carrying valve 72 therewith, the gradually increasing outside diameter of metering pin tapered portion 94 progressively decreases the effective cross-sectional area or size of the orifice to gradually increase resistance to fluid flow therethrough for smoothly and gradually decelerating the downward movement of piston 40 caused by a load applied to bumper 62.

A piston or separator 96 is mounted within chamber 90 of piston rod 48 for movement relative thereto under certain pressure conditions. A suitable seal ring 98 is retained within a peripheral groove in separator 96 for providing pressure sealing between the latter and the inner wall surface of piston rod 48. A shoulder 100 is formed on separator 96 for receiving one end of a repositioning coil spring 102, the other end of coil spring 102 abutting against the inner face of cap 60.

Shock absorber 10 also is provided with a secondary or auxiliary orifice structure including a radial bore 104 communicating with the interior of cylinder 30 beneath piston 40 by a passage 106 and with bore 86 or the interior of metering pin 76 by cavity 88. An adjustment screw 110 having a shank 112 and a tapered head formation 114 is mounted within an enlarged diameter portion 115 of bore 104. A sealing ring 116 is disposed in a peripheral groove formed about shank 112 to prevent fluid bypass between adjustment screw 110 and the enlarged diameter portion 115 of bore 104. The radial spacing between the tapered head formation 114 and the inner wall surface 104 defines an auxiliary orifice opening for the flow of fluid therethrough from the lower side of piston 40 to the upper side thereof. The transition between the inner end of shank 112 and tapered head formation 114 defines a shoulder 118 adapted to engage an annular seat 120 formed by the transition between bore 104 and the enlarged diameter portion 115 thereof for closing the auxiliary orifice opening, if desired. Shank 112 is threadably mounted within enlarged diameter portion 115 of bore 104, as at 122, for axial adjustment therein to vary the radial spacing between tapered head formation 114 and the inner wall surface of bore 104, and thereby the orifice area of the auxiliary orifice structure. A socket 124 (FIG. 5) is provided in the exposed end face of adjustment screw 110 for receiving a suitable tool for rotating adjustment screw 110 in either direction, as desired. A semi-circular depression 126, in axial alignment with bore 104, is formed on the inner face of flange 16 for receiving the exposed portion of screw 110 when threaded outwardly of bore 104. A stop pin 128 is secured in depression 126 in spaced relation to adjustment screw 110 for limiting outward movement of screw 110.

In order to insure an accurate adjustment of screw 110 in accordance with a specific application, visual indicating means are provided on flange 16 adjacent the outer end of screw 110. To this end, a thin metallic label 130 (FIG. 7), formed of aluminum foil for example, is fitted along it's central portion 132 (FIG. 5) into depression 126 with the opposite end portions of label 130 forming tabs 134 extending laterally outwardly therefrom for securement to flange 16. The opposite or rear side of label 130 is provided with a pressure sensitive adhesive coating for adhesively securing label 130 in place.

As shown in FIG. 7, label 130 is provided with a calibrated scale 136 divided into a plurality of equal spaces 138, each being colored differently to represent an increment of axial adjustment of screw 110, as referenced to the outer end face of screw 110, and represents a particular size of the orifice opening defined between the tapered head formation 114 of screw 110 and bore 104. This color code arrangement is especially desirable for adjusting a plurality of shock absorbers 10 at the same damping coefficient or to obtain the same decelerating characteristics of a number of shock absorbers 10. Also, label 130 is provided with indicia (FIG. 5) bearing numerals 1 through 4 to provide a vernier adjustment of screw 110. These numerals 1–4, as well as the colored spaces 138, can be aligned with a reference line 137 inscribed on the outer end face of screw 110 to indicate the desired setting. Also, arrows 139 and 139' are provided on label 130 to indicate the axial direction that adjustment screw 110 should be threaded in order to obtain a soft or stiff shock absorbing action, as desired. By this arrangement, a very fine and sensitive adjustment of the size of the orifice opening can be readily made for each specific application.

A lock screw 140 (FIGS. 5 and 6) is threaded into the wall of housing 12 adjacent screw 110 for locking screw 110 in the adjusted position. To this end, screw 140 has a head 142 provided with an eccentric portion 144 having an arcuate edge 146 engagable with shank 112 of screw 110. A socket 148 is provided in screw head 142 for receiving a hand tool to rotate screw 140. Screw 140 is rotated a quarter turn in one direction to disengage edge 146 from shank 112, as shown in FIG. 5, to permit axial adjustment of screw 110 and thereafter returned a quarter turn in the opposite direction to bring edge 146 into binding relation with shank 112 for locking the same in the adjusted position.

Surrounding cylinder 30 is a fluid reservoir 150 defined by the outer surface of cylinder 30, the inner surface of housing 12, and the lower and upper end plates 20 and 22. A filler port 152 is tapped into the wall of housing 12 for filling reservoir 150 with a suitable hydraulic fluid. Port 152 is closed by a threaded plug 154 having a socket (not shown) receiving a suitable tool to apply and remove plug 154.

The wall of cylinder 30 is provided with a plurality of circumferentially spaced openings 158 to establish fluid communication between reservoir 150 and the interior of cylinder 30 on the upper side of piston 40. Passage means also are provided between reservoir 150 and the interior of cylinder 30 on the opposite or underside of piston 40, such means including a passage 160 communicating with reservoir 150 and extending into bore 104, which in turn communicates with the interior of cylinder 30 via passage 106. Passage 160 is counterbored, as at 164 to accommodate a check valve 166 which permits fluid flow from passage 160 to bore 104 but prevents fluid flow in the opposite direction. A tapped opening 168 is formed in end plate 20 to provide access to check valve 166, the opening 168 being closed by a suitable plug 170.

As shown in FIGS. 1, 8 and 9, check valve 166 comprises a body 172 having a rounded head 174 surrounded by a flat shoulder 176 engagable with a seat 178 defined by the transition between passage 160 and counterbore 164. The major portion of body 172 has a flat sided configuration with the corners 180 thereof in close proximity to the annular wall of counterbore 164 (FIG. 9) and the flat sides 182 thereof defining with the inner wall surface of counterbore 164 a plurality of passages 184 to facilitate the flow of fluid past check valve 166 once the latter is unseated. The pressure differential between the fluid in cylinder 30 and reservoir 150 upon downward movement of piston 40 maintains check valve 166 seated. On the upward return stroke of piston 40, a suction force is generated on the underside of check valve 166 and the pressure differential is effective to unseat valve 166 to establish communication between reservoir 150 and passage 104.

In normal usage, shock absorber 10 of the present invention will initially be in the position shown in FIG. 1 with chamber 30 and reservoir 150 filled with hydraulic fluid and spring 66 urging bumper 62 and piston 40 to the respective extended positions shown in FIG. 1. Separator piston 96 is urged to its innermost or lowermost position against the distal end of metering pin 76 by spring 102 for closing outlet 89 and check valve 166 is positioned against seat 178 interrupting flow through passage 160. Screw 110 is threaded slightly outwardly of bore 104 to provide an orifice area of desired size between tapered head formation 114 and the wall of bore 104.

Upon the application of a load to bumper 62, piston rod 48 moves inwardly against the bias of spring 66, carrying piston 40 along therewith forcing fluid from the underside of piston 40 to the upper side thereof through the primary orifice defined by the outer tapered surface 94 of metering pin 76 and opening 74 in valve 72. The fluid under pressure above piston 40 enters chamber 90 and acts against the face of separator piston 96 to lift the same upwardly off the distal end of metering pin 76 against the bias of spring 102. As piston 40 continues to move downwardly, carrying valve 72 therewith along the tapered portion 94 of metering pin 76, the effective cross-sectional area of opening 74 progressively reduces, thus offering gradually increasing resistance to fluid flow therethrough for gradually and smoothly decelerating piston 40. When valve 72 within piston 40 reaches the constant outside diameter portion 92 of metering pin 76, fluid flow through the primary orifice is at a minimum and the resistance of fluid flow therethrough reaches its maximum and remains constant as piston 40 moves downwardly to the end of its stroke at a uniform rate. Simultaneously, fluid also flows from the lower side of piston 40 to the upper side thereof through passage 106, the small auxiliary orifice area between tapered head formation 114 and the wall of bore 104, and through metering pin bore 86 into chamber 90. The primary orifice area is substantially closed when valve 72 reaches the constant outer diameter portion 92 of metering pin 76 and the secondary path of fluid flow via bores 106, 104 and 86 becomes effective to accommodate substantially the entire flow of fluid from the lower to the upper side of piston 40. Also, this secondary path of fluid flow offers an additional orifice area for affording a greater damping or decelerating adjustment with less resistance to the applied load and a more rapid response of piston 40. The shock absorbing action can be made softer or stiffer, as desired, by enlarging or reducing the auxiliary orifice area through adjustment screw 110.

FIG. 2 illustrates the retracted position of shock absorber 10 with piston 40 disposed substantially at its lowermost position. Of course, the extent of piston retraction will vary in accordance with the magnitude of the load applied against bumper 62. The fluid displaced from the lower side of piston 40 is substantially retained within chamber 90. Chamber 90 serves as an accumulating reservoir collecting the fluid displaced from the lower side of piston 40. The pressure of the fluid displaced raises piston 96 upwardly against the bias of spring 102 relative to piston rod 48 to increase the effective volume of the accumulating reservoir.

When the load on bumper 62 is removed and the energy has been dissipated, piston 40 will move upwardly toward its original static position under the influence of springs 66 and 102. As piston 40 moves upwardly on the return stroke, it creates a suction force on the underside of check valve 166 causing the same to be displaced away from its associated seat 178, as shown in FIG. 3, establishing communication between reservoir 150 and bore 104 through passage 160. Accordingly, fluid flows from chamber 90 on the upper side of piston 40 through cavity 82 and passages 84 of piston 40, openings 158 in the wall of cylinder 30, reservoir 150, passage 160, bore 104 and passage 106 to the underside of piston 40 in cylinder 30. Simultaneously, separator piston 96 is urged downwardly in chamber 90 under the influence of spring 102 until it seats on the distal end of metering pin 76 to interrupt communication between bore 86 and chamber 90. Piston 40 continues to move upwardly until it reaches its original static position, as shown in FIG. 1.

A significant feature of this invention resides in the fluid circulating system for displacing fluid from one side of piston 40 to the other. As is known, heat is generated in the volume of fluid beneath piston 40 and as a result of the velocity increase of the fluid flowing through the orifices from the high pressure side of piston 40 to the low pressure side thereof. This heat is dissipated by the cooling effect of the fluid passing through reservoir 150, which in turn is cooled by the relatively large heat transfer surface of the inner wall of housing 12. Moreover, the volume of fluid in cylinder 30 beneath piston 40 is approximately one-sixth the total volume of fluid flowing through the circulation system so that this volume of fluid beneath piston 40 is used only once in every six cycles of operation to facilitate maximum heat dissipation. This enables the shock absorber 10 to be repeatedly cycled at relatively rapid rates without undesirable heat build-up, thereby prolonging the useful life of the sealing rings and other components forming shock absorber 10.

Another significant feature of this invention resides in the auxiliary orifice arrangement defined by adjustment screw 110 and bore 104 to provide an additional path for fluid flow upon retraction of piston 40. This affords a softer shock absorbing action with less resistance to the applied load and offers a more rapid response of piston 40. Screw 110 is axially adjustable for varying the size of the auxiliary orifice to soften or stiffen the shock absorbing action, as desired. The combination of the numerals and the colored spaces imprinted on label 130 affords a vernier-like adjustment of screw 110 to provide a very fine and sensitive adjustment of the auxiliary orifice. Also, this color code arrangement facilitates the adjustment of a plurality of shock absorbers to impart the same damping or decelerating characteristics to a series of such shock absorbers. This additional flow path provided by the auxiliary orifice structure also includes the bore 86 of hollow metering pin 76 which provides a direct path to the accumulating reservoir of chamber 90. Employing a hollow metering pin to complete the auxiliary flow path is a significant feature of this invention.

From the foregoing, it is apparent that the objects of the present invention have been fully accomplished. The provision of a novel fluid circulating system facilitates heat dissipation, permitting rapid and repeated cyclic action of the shock absorber without adversely affecting the same. The provision of an auxiliary orifice arrangement, having a finite adjustment, augments piston and load deceleration, as desired.

A preferred embodiment of this invention having been described and illustrated in detail, it is to be understood that this has been done by way of illustration only.

I claim as my invention:

1. A shock absorber comprising: a cylinder having a chamber containing hydraulic fluid; a piston mounted in said cylinder for reciprocating movement in said chamber relative thereto, said piston having an axial bore therethrough and means defining an annular recess in said bore; a fixed metering pin projecting through said axial bore of said piston; a valve element captively retained in said recess of said piston about said metering pin and defining therewith a primary orifice structure for controlling the flow of fluid from one side of said piston to the other side thereof, said valve element being retained in said recess in a manner permitting limited free axial and lateral movement relative thereto for self-centering orientation about said metering pin and said metering pin being provided with a tapered portion projecting through said valve element for varying the opening of said primary orifice upon movement of said piston in said chamber; an auxiliary orifice structure defining an opening for augmenting fluid flow from the region of said chamber on said side of said piston to the region of said chamber on said other side of said piston; said metering pin having an axial bore therethrough to provide an internal passage communicating at the opposite ends thereof with said auxiliary orifice opening and the other side of said piston, respectively; adjustable means mounted in said shock absorber for movement in said opening upon external application of a mechanical force input to said adjustable means for varying the size of said opening of said auxiliary orifice structure by a predetermined amount in proportion to said external input to control the relative softness or relative stiffness of the shock absorbing action, said adjustable means including means for maintaining the adjusted size of said opening until another external input is applied; a hollow piston rod connected at one end thereof to said piston and movable between fully extended and retracted positions and adapted to receive a load at the other end thereof, a second piston mounted in said hollow piston rod for reciprocating movement relative thereto and defining therewith an accumulating reservoir, and spring means for biasing said second piston against said end of said metering pin on said other side of said first-named piston when said hollow piston rod is in said fully extended position.

2. A shock absorber according to claim 1 including an end plate closing one end of said cylinder; said metering pin connected at one end thereof to said end plate and passage means in said end plate including said auxiliary orifice opening connecting said chamber to said axial bore of said metering pin.

3. A shock absorber according to claim 1 including a bumper secured to the outer end of said piston rod for receiving said load.

4. A shock absorber according to claim 2 wherein said adjustable means comprises a screw adjustable in said passage means and having a tapered head formation defining therewith said opening in said auxiliary orifice structure.

5. A shock absorber according to claim 4 including means on said end plate for indicating the extent of axial movement of said screw within said passage means.

6. A shock absorber according to claim 5 including indicia on the exposed face of said screw referenced to said indicating means for effecting a fine axial adjustment of said screw to precisely control the size of said auxiliary orifice opening.

7. A shock absorber according to claim 4 including means for locking said screw in a selectively adjusted position.

8. A shock absorber according to claim 1 including a housing surrounding and spaced from said cylinder defining a reservoir therebetween.

9. A shock absorber according to claim 8 including a pair of lateral flanges rigidly secured to the opposite ends of said housing.

10. A shock absorber according to claim 8 including circuit means for dissipating heat generated in said fluid; said circuit means including at least one opening in said cylinder on said other side of said piston communicating with said reservoir; and passage means connecting said reservoir to said chamber.

11. A shock absorber according to claim 10 wherein said passage means includes a check valve for closing said passage means against fluid flow therethrough from said chamber to said reservoir.

12. A shock absorber comprising: a cylinder having a chamber containing hydraulic fluid; a piston connected to a piston rod and operatively positioned in said cylinder for reciprocating movement in said chamber between a position defining a maximum volume in said chamber when said rod is fully extended and a position defining a minimum volume in said chamber when said rod is fully retracted; a fixed hollow metering pin projecting through said piston; means on said piston about said metering pin and operatively associated therewith defining a primary orifice structure for controlling the flow of fluid from the region of said chamber on one side of said piston to the region of said chamber on the other side of said piston in response to movement of said piston in one direction; an auxiliary orifice structure defining an opening and said metering pin providing an internal passage communicating at the opposite ends thereof with said auxiliary orifice opening and the other side of said piston, respectively, for augmenting fluid flow from said one side to said other side of said piston; a housing surrounding and spaced from said cylinder defining a fluid reservoir containing hydraulic fluid between said housing and said cylinder; and at least one opening in said cylinder on said other side of said piston placing said region of said chamber in fluid communication with said reservoir and passage means connecting said reservoir to said region of said chamber on said one side of said piston whereby upon return movement of said piston in the opposite direction fluid flows from said region of said chamber on said other side of said piston into said reservoir where said fluid is cooled and then said fluid flows from said reservoir into said region of said chamber on said one side of said piston, the spacing of said housing from said cylinder being of sufficient distance such that said maximum volume in said chamber defined by said piston is about one-sixth of the total volume of hydraulic fluid in the fluid circulation system including said chamber and said reservoir so that the volume of hydraulic fluid in said chamber is used only once in every six cycles of operation of said shock absorber.

13. A shock absorber according to claim 12 including a pair of lateral flanges rigidly secured to the opposite ends of said housing.

14. A shock absorber according to claim 12 wherein said passage means includes a check valve for closing said passage means against fluid flow therethrough from said chamber to said reservoir.

15. A shock absorber comprising: a cylinder having a chamber containing hydraulic fluid; a piston having an axial bore and operatively positioned in said cylinder for reciprocating movement in said chamber relative thereto; a fixed, hollow metering pin projecting through said piston bore; a valve element on said piston about said metering pin and operatively associated therewith defining a primary orifice structure for controlling the flow of fluid from the region of said chamber on one side of said piston to the region of said chamber on the other side of said piston in response to movement of said piston in one direction; said valve element being mounted on said piston for limited free movement relative thereto for self-centering orientation about said metering pin; an auxiliary orifice structure defining an opening and said metering pin providing an internal passage communicating at the opposite ends thereof with said auxiliary orifice opening and the other side of said piston, respectively, for augmenting fluid flow from said one side to said other side of said piston; adjustable screw means operatively positioned in said shock absorber and having a head formation shaped to define therewith said opening in said auxiliary orifice structure, said screw means being movable for varying the size of said opening of said auxiliary orifice structure by a predetermined amount to control the relative softness or stiffness of the shock absorbing action; means for locking said screw means in a selectively adjusted position maintaining the adjusted size of said opening until another adjustment is made; a housing surrounding and spaced from said cylinder defining a fluid reservoir between said housing and said cylinder; and at least one opening in said cylinder on said one side of said piston placing said region of said chamber in fluid communication with said reservoir and passage means connecting said reservoir to said region of said chamber on said other side of said piston whereby upon return movement of said piston in the opposite direction fluid flows from said region of said chamber on said one side of said piston into said reservoir where said fluid is cooled and then said fluid flows from said reservoir into said region of said chamber on said other side of said piston, said passage means including a check valve for closing said passage means against fluid flow therethrough from said chamber to said reservoir; and a hollow piston rod connected at one end to said piston and adapted to receive a load at the other end thereof, a second piston mounted in said hollow piston rod for reciprocating movement relative thereto and defining therewith an accumulating reservoir, and means biasing said second piston against said metering pin in the extended position of said piston rod.

* * * * *

UNITED STATES PATENT OFFICE
CERTIFICATE OF CORRECTION

Patent No. 3,991,863 Dated November 16, 1976

Inventor(s) Patrick P. Lee

It is certified that error appears in the above-identified patent and that said Letters Patent are hereby corrected as shown below:

Claim 1, line 30, after "said", first occurrence, insert -- one --.

Signed and Sealed this twelfth Day of July 1977

[SEAL]

Attest:

RUTH C. MASON
Attesting Officer

C. MARSHALL DANN
Commissioner of Patents and Trademarks